Jan. 8, 1946.    L. M. PERSONS    2,392,613
THERMAL CONTROL APPARATUS
Filed June 22, 1942
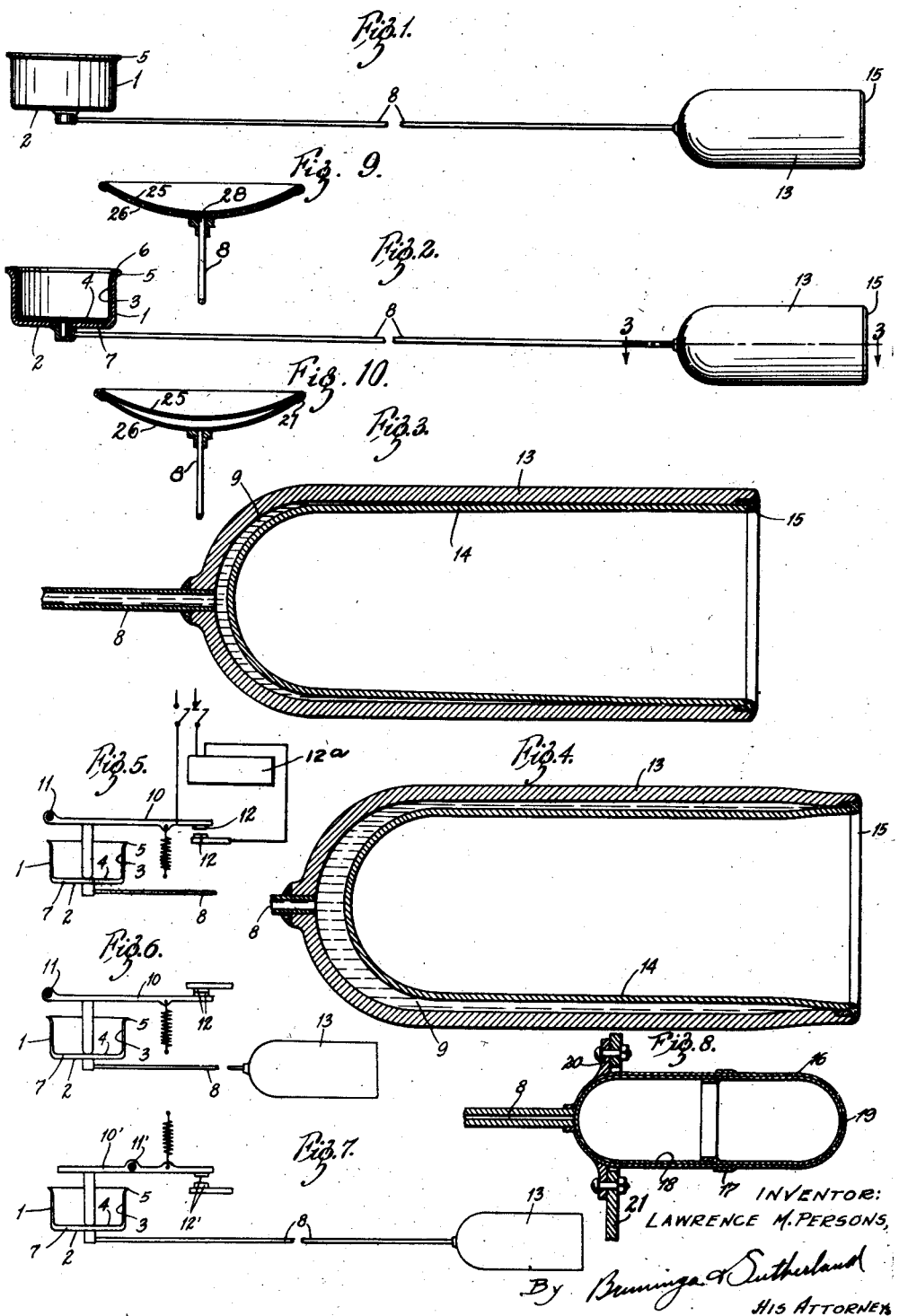
INVENTOR:
LAWRENCE M. PERSONS,
By Benninga & Sutherland
HIS ATTORNEYS Patented Jan. 8, 1946

2,392,613

UNITED STATES PATENT OFFICE 2,392,613

THERMAL CONTROL APPARATUS

Lawrence M. Persons, Ladue, Mo., assignor to L. M. Persons Corporation, St. Louis, Mo., a corporation of Missouri Application June 22, 1942, Serial No. 448,012

6 Claims. (Cl. 297—3)

This invention pertains to apparatus for operating regulating means in accordance with variations in temperature. The specific apparatus herein described as illustrating an application of the invention is organized for the control of the temperature of a heating device such as an oven or the like.

Heat regulating apparatus of the type described herein is usually organized to include a thermosensitive element subject to the temperature to be regulated, regulating means usually applied to regulate the application of heat which determines the temperature to which said thermosensitive element is subject, and a connection between said thermo-sensitive element and said regulating means including a medium for transmitting a force applied by said thermo-sensitive element to said regulating means. As such an organization is usually applied, the action of the thermo-sensitive device is to exert a force which increases with rise of the temperature, and this force is applied to the regulating means in such a manner that as the force increases in response to a rise of temperature the regulating means is operated to reduce that temperature. Under such circumstances, if the connection between the thermo-sensitive element and the regulating means should be broken, the regulating means will operate to increase the application of heat, since the force applied for regulation is reduced or entirely eliminated by rupture of said connection. Accordingly, in the event of such rupture, a dangerous condition is set up in which the application of heat is continued and perhaps increased without regulation thereof.

In accordance with the principle of this invention, a flow of energy is directed from the sensitive element which responds to the quantity to be regulated, such as temperature, toward regulating means to operate the latter to increase the regulated quantity to a value involving greater risk or requiring more alert control. In other words, when temperature is to be regulated, an increase in temperature involves a greater risk requiring more alert control. Accordingly, the reaction of the sensitive element is such that when the temperature falls, a flow of energy is directed from that sensitive element toward the regulating means and the response of the regulating means to such flow of energy in that direction is to raise the temperature. It will be seen, therefore, that in order for the regulating means to cause an increase in temperature, the flow of energy must be toward said regulating means. Conversely, a failure of such a flow of energy will cause the regulating means to respond in the opposite direction, namely, to reduce the temperature. It will be seen that in accordance with this principle, a failure of the apparatus at any point, whether it be in the sensitive device, in the regulating means, or in the connections between them, no energy can be transmitted to operate the regulating means, and, accordingly, the temperature or other regulated quantity cannot be changed in the dangerous direction, for instance so as to increase the temperature. This arrangement, therefore, is such that failure of any part will result in a return of the regulated quantity toward its normal or inoperative value, this expression being used hereinafter to designate a harmless condition, such as, in the case of temperature, a fall of the temperature to normal atmospheric value.

In the application of this principle, the sensitive device is arranged to exert an increased force on the regulating means in order to increase the temperature. As a result, therefore, failure of the sensitive device or of connections thereto renders it incapable of exerting such force, and therefore the temperature or other regulated quantity is returned to a safe value.

An important object of this invention therefore is to provide an organization of control apparatus such that if the connection to the regulating means is broken, said regulating means will operate to reduce or cut off the application of heat. In other words, failure of such connection will result in automatic regulation to reduce the temperature being regulated toward atmospheric temperature.

Another object of this invention is to provide for such a control organization a thermo-sensitive element which will operate upon rise of temperature to decrease the force transmitted to the regulating means.

Another object is to provide such a thermosensitive element of novel construction.

Another object is to provide a novel organization of the regulating means and its relation to the quantity regulated, such as the application of heat in the example given above.

Further objects will appear from the following description taken in connection with the accompanying drawing, in which:

Figure 1 is a view somewhat diagrammatic in form illustrating apparatus embodying this invention.

Figure 2 is a similar view showing the regulating device in section.

Figure 3 is a longitudinal sectional view somewhat enlarged of a thermosensitive element embodying this invention, illustrating its condition at lower temperatures.

Figure 4 is a view similar to Figure 3, illustrating the condition of this element at higher temperatures.

Figure 5 is a diagram illustrating the relation of the regulating device to the means for controlling the application of heat as heretofore applied, this figure representing the high temperature condition.

Figure 6 is a diagram similar to Figure 5 but illustrating the relation of these parts in accordance with this invention.

Figure 7 is a view similar to Figure 6 illustrating the effect of failure of the connection between the thermosensitive element and the regulating means, and Figure 8 is a sectional view showing another form of construction for the thermosensitive element and a way of mounting the same in accordance with this invention.

Figure 9 is a central sectional view of a modified form of thermosensitive element in its condition at atmospheric temperature.

Figure 10 is a similar view of the element of Figure 9 in its condition at elevated temperature.

The organization selected for illustration in the drawing is of the type ordinarily employed for regulating the temperature of heating devices such as ovens, for instance in electric stoves. The invention may, however, be applied to the regulation of other quantities, particularly where such regulation is likely to set up a dangerous condition in case of failure of the control apparatus.

In Figure 1 the reference numeral 1 indicates a regulating device shown in Figure 2 as comprising an outer cup 2 and an inner cup 3 whose bottom 4 provides a diaphragm. The cup 3 is nested within the cup 2 and secured to the rim 5 thereof by means of solder or welding, as indicated at 6. Between the bottom 4 of the cup 3 and the bottom of the cup 2 a small space or chamber 7 is provided which is connected by means of a capillary duct 8 to the thermo-sensitive element.

This thermo-sensitive element comprises an outer cylinder 13 of substantial length, closed at one end, and a similar inner cylinder 14 nested therein with a close fit. The cylinders 13 and 14 are connected together at their outer rims as by means of solder or welding, as indicated at 15. This leaves a small space between the cylinders 14 and 15 providing a container or envelope of small capacity within which a medium 9 is contained so as to occupy this space, the duct 8 and the space 7 of the element 1. The medium 9 is adapted to be acted upon by a force exerted by the thermosensitive element in response to temperature changes and to transmit such forces along the duct 8 to the diaphragm 4 of the element 1. In the embodiment illustrated, the medium 9 is preferably a liquid on account of the specific organization of the embodiment illustrated. However, other forms of media such, for instance, as gases may be used under some circumstances.

The outer cylinder 13 is constructed of a material having a relatively high rate of thermal expansion while the inner cylinder 14 is constructed of a material of a lower rate of thermal expansion. In practice, it has been found that to make the outer cylinder 13 of brass and the inner cylinder 14 of steel provides an effective combination. In the construction of this element it is preferable to make the space between the inner and outer cylinders 13 and 14 as small as possible. Under these conditions then, the difference in expansion between the inner and outer cylinders will cause this space to increase when the temperature rises. This is on account of the fact that the brass outer cylinder 13 has a greater expansion than the steel inner cylinder 14 and, since these are connected at their rims, the difference in expansion must appear at the closed ends of the cylinders and will tend to separate the closed ends and thus increase the space between them. The connection of the duct 8 is made to the cylinder 13 at its closed end, as illustrated in Figures 3 and 4.

It will be seen that, since the medium 9 occupies the entire space between the cylinders 13 and 14, the entire bore of the duct 8 and the entire space 7, variation in the capacity of the space between the cylinders 13 and 14 will cause movement of the medium 9 along the duct 8 toward or from the regulating device 1. Movement toward said device will cause the diaphragm 4 to bulge upwardly, as seen in Figure 2, and conversely a movement of the liquid away from the device 1 will cause said diaphragm to fall. It will be seen also that a rise of the temperature to which the element 13, 14 is subjected will cause an increase of the space between them. Accordingly, this space provides a container or envelope in which that medium is contained and which increases its capacity with rise of temperature. Such increase in capacity furthermore will tend to draw the medium 9 into said container and away from the device 1. Accordingly, increase of temperature of the thermo-sensitive element will result in a retrograde movement of the medium 9 relative to the regulating means 1. Accompanying this action it will be noted that the medium 9 acts as a pressure medium to transmit pressure exerted by action of the thermo-sensitive element to the device 1. It will be noted also that this pressure increases with fall of that temperature and decreases with rise of that temperature. If at any time the duct 8 should be broken, the medium 9 would escape from that duct and from the space 7 of the element 1, or at least any pressure which might be active in that medium would be reduced. It will be noted therefore that the effect of rise of temperature on the movement of the medium 9 toward or away from the device 1 is in the same direction as the movement thereof resulting from a rupture of the duct 8.

Referring now to Figure 5, this figure illustrates one way in which a regulating device such as this would be applied in accordance with the practice followed heretofore. The diaphragm 4 in its up and down movement acts to raise and lower an arm 10 pivoted at 11 and operating contacts 12 of an electric circuit, which may be the heating circuit for applying heat to regulate the temperature to which the thermo-sensitive element is subject or which may control the operating circuit for any suitable temperature changing means, represented at 12a. Figure 5 shows the condition at elevated temperature. Under such elevated temperature the pressure in the space 7 is high and therefore tends to raise the arm 10 and separate the contacts 12. This opens the heating circuit and thereby tends to reduce the temperature being regulated. It will be seen that with this arrangement if the duct 8 should be broken the pressure fluid would escape and the pressure in the space 7 would be reduced. This would cause the arm 10 to fall and bring the contacts 12 together thereby closing the heating circuit. Accordingly, upon failure of the duct 8 the heat would be turned on and there would be nothing to regulate or even limit the application of heat, and consequently there would be danger of overheating the oven or furnace or even of starting a fire.

In the arrangements of Figures 6 and 7, on the other hand, the arm 10 and the contacts 12 are so arranged that said contacts are opened when the pressure in the space 7 falls. Accordingly, if the duct 8 should be broken and the medium 9 escaped, the device would act to open the heating circuit and thereby tend to reduce the temperature of the oven or furnace to atmospheric temperature. Accordingly, this organization automatically sets up conditions for safety in case of failure of any of the parts.

It will be seen therefore that this invention accomplishes its objects in providing an organization which automatically sets up safe conditions in the event of failure of certain of its elements. This is accomplished because the direction of the change in the force transmitted from the thermo-sensitive element to the regulating means is such that the change is in the same direction for rise of temperature as for failure of an element. The medium which transmits the force has a retrograde movement relative to the regulating means in response to rise of temperature of the thermo-sensitive element. This result is contributed to by the direction of change of the thermo-sensitive element, namely the element is constructed to provide a container adapted to contain a portion of the force-transmitting medium, and this container is subject to a very substantial increase in capacity with rise of temperature. This increase in capacity draws the medium into the container and away from the regulating means. This effect together with the organization of the regulating means, as illustrated in Figures 6 and 7, now show that a decrease in the force transmitted by the medium 9 results in operation of the regulating means, such as to adjust the quantity regulated, in this case the heating current, to its inoperative value or to such condition as to tend to reduce the temperature under control to atmospheric temperature.

As has been pointed out, it is ordinarily preferable to make the capacity of the container formed between the cylinders 13 and 14 as minute as possible at atmospheric temperature. When this is done, the amount of the medium 9, which is contained in this container and which is subject to the changes of temperature thereof, is reduced to a minimum. Accordingly, any effect of thermal expansion in the medium itself will be reduced to a minimum. However, a somewhat greater initial capacity in this container can be used where it is not important to minimize the amount of medium in the system.

Figure 8 illustrates another form of construction for the thermosensitive element which is advantageous under certain circumstances. In this arrangement, an outer member 16 may be made in the form of a closed shell, for instance, by making two cup-shaped members joined as indicated at 17. A similarly shaped inner member 18 is formed to have a close fit within the member 16. The inner member 18 may be of similar construction to that of the outer member 16, or it may be made solid or in any other suitable form. In this case, also, the outer member 16 is made of material having a higher rate of thermal expansion than the inner member 18. These two members are then connected together at one end, as, for instance, by welding or soldering together as indicated at 19. This, therefore, provides that all relative movement between the inner and outer members, due to their different expansion will take place at the end opposite to the connection 19. The duct 8 is connected to the outer member 16 at the said opposite end so as to communicate with the minute chamber formed between the two members.

The inner and outer elements 18 and 16 are preferably made to fit as closely as possible. If during the assembly of these elements, they are heated to an elevated temperature and then closely fitted together, the joint 17 being made at the elevated temperature, the subsequent shrinkage upon cooling will be greater for the outer member 16 than for the inner member 18, and, consequently, a condition of stress between these two members will be set up. This initially stressed condition will then operate to suppress the sensitivity of this element at lower temperatures. In other words, there will be no relative movement until a temperature is reached at which these initial stresses are relieved, and the response of the device to changes of temperature will begin at this minimum temperature and extend through a range from that temperature upward. In this manner the control exercised by this element may be made to start at a predetermined minimum temperature.

To provide for mounting the element of Figure 8 any suitable mounting means, such as a mounting flange 20, may be formed on or attached to the outer member 16 by any suitable means. This flange may be placed a short distance from the end to which the duct 8 is connected, and when so placed the device may be mounted by its flange 20 upon the wall 21 of the oven or of the device to be heated. This mounting provides that while the major portion of the element extends into the oven so as to be subject to the heat thereof, a substantial part of the chamber between the two elements is outside of the oven and is shielded to a certain extent from the oven heat by the flange 20 and the wall 21. Accordingly, that part of the thermosensitive element containing the major volume of the medium contained in that chamber and the duct 8 is subject to somewhat less rise of temperature than the part of the element which extends into the oven, and therefore the medium contained therein is subject to less expansive effect due to the oven heat. This tends to reduce any error which may be due to expansion of that medium. This mounting arrangement may, of course, be applied to the other forms of construction for the thermosensitive elements, as shown in the other figures, and will have a similar effect.

The thermosensitive element illustrated in Figures 9 and 10 comprises an inner member 25 which is formed convex downwardly and an outer member 26 formed concave on its upper face. In the embodiment shown, these are dish-shaped members which may be formed of sheet material. They are assembled in nested relation so that the convex face of the member 25 and the concave face of the member 26 are practically in contact with each other. These two members are then connected together at their extremities, namely, at the rim 27, by any suitable means such as crimping the edge of one member over the other, or by soldering, welding, or the like. The outer member 26 may be perforated with an opening 28, and the capillary 8 may be connected to the outer member at this point, so that the medium 9 may have access to the region between these two members.

This form of thermosensitive element is extremely sensitive and its action is very rapid. The outer member 26 is constructed of material having a higher rate of thermal expansion than the inner member 25, so that when the element is subjected to higher temperatures, the more rapid expansion of the outer member 26 places the inner member 25 under tension while the outer member, of course, is placed under compression. It will be noted that this has the effect of separating the extremities of the arc formed by these members at the rim 27. For instance, in the illustrated embodiment the circle of the rim 27 is increased in diameter by expansion of the outer member. Accordingly, this will stretch the inner member by outward tension at its extremities. The result is that the members 25 and 26 become separated at their middle portion, as shown in Figure 10. This, of course, increases the space between them, and in the form illustrated the capacity of the chamber formed between these elements is increased to a great extent and very rapidly. Accordingly, the element in this form is well adapted for use under circumstances where a quick response to temperature changes is desired.

It will be clear, of course, that the materials used in the construction of the elements 13—14, 16—18, and 25—26 should be so selected, with reference to their coefficients of expansion, that, for a given temperature change, the increase in the capacity of the space between them is substantially greater than the corresponding increase in the volume of that portion of the medium 9 contained in that space. Where the duct 8, or a portion of it, is also exposed to the varying temperature to be controlled, its rate of expansion should also be taken into account in calculating the movement of the medium 9.

Where the temperatures to be regulated are below normal atmospheric temperature, as in refrigeration, the inner member of the concavo-convex pair 13—14, 16—18, or 25—26 may be the one which has the higher coefficient of expansion. In that case cooling the device will cause the inner member to contract at a faster rate than the outer member, so that their meniscus-shaped portions will be separated to a greater and greater extent as the temperature is progressively lowered. The regulating control will then be similar to that described above for high temperatures, due allowance being made again for different rates of expansion of the several materials used, and that some of these may now act in different relative directions. For instance, contraction of the medium 9 will now increase its regulating movement instead of decreasing it as in high temperature operation.

Having thus described the invention, what is claimed is:

1. A thermo-sensitive bulb, for exposure to temperature that is to be controlled comprising, a substantially inflexible exterior bulb member, a substantially inflexible filler member having substantially the same exterior surface contour and size as the interior contour and size of the bulb member, the bulb and filler being nested to define an interspace therebetween and the bulb being hermetically sealed about the filler save for a tube extending therethrough to communicate the interspace with the exterior, the filler having a lower coefficient of thermal expansion than the bulb, and means for positioning the filler centrally within the bulb.

2. In a temperature control apparatus, an element to be actuated, a chamber having a flexible part arranged to actuate said element upon variations of volume of said chamber, a temperature sensitive bulb arranged to be exposed to the temperature to be controlled, a tube connecting said bulb and said chamber, fluid enclosed in the bulb-tube-chamber system, said bulb comprising, nested members each having an exposed surface, said members being hermetically connected together to define an enclosed space between them, said members being formed of materials having different coefficients of expansion with the internal member having the lesser coefficient of expansion.

3. In a temperature control apparatus, an element to be actuated, a chamber having a flexible part arranged to actuate said element upon variations of volume of said chamber, a temperature sensitive bulb arranged to be exposed to the temperature to be controlled, a tube connecting said bulb and said chamber, fluid enclosed in the bulb-tube-chamber system, said bulb comprising, nested members each having an exposed surface, said members being hermetically connected together to define an enclosed space between them, said members being formed of materials having different coefficients of expansion with the internal member having the lesser coefficient of expansion, said members being substantially contiguous at low temperatures.

4. In a temperature control apparatus, an element to be actuated, a chamber having a flexible part arranged to actuate said element upon variations of volume of said chamber, a temperature sensitive bulb arranged to be exposed to the temperature to be controlled, a tube connecting said bulb and said chamber, fluid enclosed in the bulb-tube-chamber system, said bulb comprising a pair of dished members hermetically connected adjacent their margins and free of connection therebetween to define an interspace, the inside one of said members having the lower coefficient of thermal expansion, said tube communicating with the interspace.

5. In a temperature control apparatus, an element to be actuated, a chamber having a flexible part arranged to actuate said element upon variations of volume of said chamber, a temperature sensitive bulb arranged to be exposed to the temperature to be controlled, a tube connecting said bulb and said chamber, fluid enclosed in the bulb-tube-chamber system, said bulb comprising a pair of dished members hermetically connected adjacent their margins and free of connection therebetween, to define an interspace the inside one of said members having the lower coefficient of thermal expansion, said tube communicating with the interspace, said interspace being substantially nil when the device is cold.

6. In a temperature control apparatus, an element to be actuated, a chamber having a flexible part arranged to actuate said element upon variations of volume of said chamber, a temperature sensitive bulb arranged to be exposed to the temperature to be controlled, a tube connecting said bulb and said chamber, fluid enclosed in the bulb-tube-chamber system, said bulb comprising, nested members, at least one member having an exposed surface, said members being hermetically connected to define an enclosed space between them, said members being formed of materials having different coefficients of expansion with the internal member having the lesser coefficient of expansion.

LAWRENCE M. PERSONS.